US007020649B2

(12) United States Patent
Cochrane et al.

(10) Patent No.: US 7,020,649 B2
(45) Date of Patent: Mar. 28, 2006

(54) SYSTEM AND METHOD FOR INCREMENTALLY MAINTAINING NON-DISTRIBUTIVE AGGREGATE FUNCTIONS IN A RELATIONAL DATABASE

(75) Inventors: Roberta Jo Cochrane, Los Gatos, CA (US); Themistoklis Palpanas, Toronto (CA); Mir Hamid Pirahesh, San Jose, CA (US); Richard Sefton Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 10/335,376

(22) Filed: Dec. 30, 2002

(65) Prior Publication Data

US 2004/0128289 A1 Jul. 1, 2004

(51) Int. Cl.
*G06F 17/30* (2006.01)

(52) U.S. Cl. ............................................... 707/3; 707/5
(58) Field of Classification Search ................ 707/2, 707/3, 5
See application file for complete search history.

(56) References Cited

U.S. PATENT DOCUMENTS

| 5,535,385 | A | 7/1996 | Griffin et al. ............... 395/600 |
|---|---|---|---|
| 5,897,632 | A | 4/1999 | Dar et al. ...................... 707/2 |
| 5,991,754 | A | 11/1999 | Raitto et al. ................... 707/2 |
| 6,026,390 | A | 2/2000 | Ross et al. ..................... 707/2 |
| 6,125,360 | A | 9/2000 | Witkowski et al. ............ 707/2 |
| 6,134,543 | A | 10/2000 | Witkowski et al. ............ 707/2 |
| 6,199,063 | B1 | 3/2001 | Colby et al. ................... 707/4 |
| 6,205,451 | B1 | 3/2001 | Norcott et al. ............... 707/204 |
| 6,249,791 | B1 | 6/2001 | Osborn et al. .............. 707/200 |
| 6,334,128 | B1 | 12/2001 | Norcott et al. ................. 707/5 |
| 6,484,159 | B1 * | 11/2002 | Mumick et al. ............... 707/2 |

OTHER PUBLICATIONS

"Extending complex ad-hoc OLAP"—Johnson et al. Proceedings of the eighth international conference on information and knowledge management, Nov. 1999, pp. 170-179.
"Efficient view maintenance at data warehouses"—Agrawal et al. ACM SIGMOD Record, Proceedings of the 1997 ACM SIGMOD International Conference on Management of Data, Jun. 1997, vol. 26, Issue 2, pp. 417-427.
"Incremental Maintenance for Non-Distributive Aggregate Functions"—Palpanas et al. Proceedings of thr 28th VLDB Conference, Hong Kong, China, 2002.

* cited by examiner

*Primary Examiner*—Safet Metjahic
*Assistant Examiner*—Thanh-Ha Dang
(74) *Attorney, Agent, or Firm*—John L. Rogitz

(57) ABSTRACT

A system for incrementally maintaining non-distributive aggregate functions in a relational database includes a data storage device in which a relational database is stored. A processor communicates with the data storage device and includes a database maintenance module. The database maintenance module includes a program for incrementally maintaining non-distributive aggregate functions in a relational database. The method embodied in the program includes determining whether all functions in a relational database query are distributive. Based on this determination, a basic propagate phase graph is selectively altered to yield a new propagate phase graph. Changes to an automatic summary table are then applied thereto based on the new propagate phase graph.

12 Claims, 6 Drawing Sheets

PROPAGATE PHASE COMPILATION LOGIC

UDATE OPERATION COMPILATION
WITH AST's

PROPAGATE PHASE COMPILATION LOGIC

APPLY PHASE
COMPILATION LOGIC

APPLY PHASE
COMPILATION LOGIC

SYSTEM AND METHOD FOR INCREMENTALLY MAINTAINING NON-DISTRIBUTIVE AGGREGATE FUNCTIONS IN A RELATIONAL DATABASE

FIELD OF THE INVENTION

The present invention relates generally to computer software, and more specifically to database management software for managing relational database systems.

BACKGROUND OF THE INVENTION

Materialized views, or Automatic Summary Tables (ASTs), are increasingly being used to facilitate the analysis of the large amounts of data being collected in relational databases. The use of ASTs can significantly reduce the execution time of a query. This reduction in execution time is particularly significant for databases with sizes in the terabyte to petabyte range. Such queries tend to be extremely complex and can involve a large number of join and grouping operations.

One major advantage of using ASTs is that they are precomputed once and subsequently can be used multiple times to quickly answer complex queries. When base relations are modified, these modifications must be propagated to the affected ASTs. Unfortunately, using current techniques, the systems can only incrementally update a restricted set of ASTs, e.g., those only containing distributive aggregate functions. The remainder must be fully recomputed. Previous work has studied the problem of incremental view maintenance in which all the necessary changes for the AST are computed based only on the modifications to the base table (and the corresponding values in the AST). This process is called incremental view maintenance and many commercial products support it.

Due to the complexity of the queries and the magnitude of the data, recomputation of ASTs in large-scale databases is prohibitive. Since the set of updates to the base tables is usually only some small percentage of those tables, incremental maintenance of an AST is usually much quicker than full recomputation. For example, a typical warehouse can contain up to six (6) years of data. Daily inserts into a fact table in this warehouse may constitute only about five hundredths of a percent (0.05%) of the entire size of the table, while an associated AST can grow up to a billion rows. When updates occur in the base data, the system determines which ASTs are affected and propagates the changes through the AST definitions to produce the delta changes. It then applies these deltas to their respective ASTs. If an AST is automatically refreshed in the same unit of work as the changes to the underlying base data are applied, then the maintenance is considered immediate. Otherwise, it is deferred.

SUMMARY OF THE INVENTION

The present invention provides a system, method, and computer program product for immediate incremental maintenance of non-distributive aggregate functions in materialized views of relational databases. The invention supports efficient incremental maintenance of all aggregate functions including powerful statistical and analytic functions (such as standard deviation and linear regression functions) and all user-defined aggregate functions. The computer program product for incrementally maintaining non-distributive aggregate functions in a relational database includes logic means for determining whether all functions in a relational database query are distributive. Further, the computer program product includes logic means that selectively alters a predetermined propagate phase data structure to yield a new propagate phase data structure. The computer program product also includes logic means that uses the new propagate phase data structure to apply changes to an automatic summary table in a relational database.

In a preferred embodiment, the computer program product also includes logic means that determines whether deltas in the query are insert-only and all functions of the query are distributive or MAX or MIN. The predetermined propagate phase data structure is altered based on this determination. Preferably, the predetermined propagate phase data structure is also selectively altered based on determining whether deltas in the query are deletes only.

In a preferred embodiment, the computer program product alters the predetermined propagate phase data structure by using logic means that builds a join predicate between the basic predetermined propagate phase data structure and the AST query graph. The logic means then pushes the join predicate down to each leaf operation of the AST query graph and adds the join predicate to each leaf operation where the join predicate is to the top of the predetermined propagate phase data structure to yield the new propagate phase data structure. Moreover, the computer program product includes logic means that determines if deltas in non-distributive functions are deletion free. If so, logic means reroutes distributive function columns. Otherwise, logic means creates a left outer join operation between the top of the predetermined propagate phase data structure and the AST query graph.

Preferably, the computer program product includes logic means that selectively builds an inner join operation between the new propagate phase data structure and an automatic summary table if there are not any inserts to be applied to an automatic summary table. If there are any inserts to be applied to an automatic summary table, logic means within the computer program product builds a left outer join operation between the new propagate phase data structure and an automatic summary table. In a preferred embodiment, the computer program product also includes logic means that adds an update operation above the automatic summary table if an update to the automatic summary table is required. If a delete to an automatic summary table is required, logic means adds a delete operation above the automatic summary table. Additionally, if an insert to an automatic summary table is required, logic means adds an insert operation above the automatic summary table.

In another aspect of the present invention, a database management system includes a data storage device in which a relational database is stored. A processor communicates with the data storage device and has a database maintenance module associated therewith. The database maintenance module includes a program for incrementally maintaining non-distributive aggregate functions in a relational database.

In yet another aspect of the present invention, a method for incrementally maintaining non-distributive aggregate functions in a relational database includes selectively altering the predetermined propagate phase data structure. The predetermined propagate phase data structure is altered by building a join predicate between the predetermined propagate phase data structure and the AST query graph. The join predicate is pushed down to each leaf operation of the AST query graph. Further, the join predicate is added to each leaf operation where the join predicate is to the top of the predetermined propagate phase data structure. These steps yield a new propagate phase data structure.

In another aspect of the invention, a method to perform efficient incremental maintenance of non-distributive aggregate functions including user-defined aggregate functions in materialized views when base tables of the materialized view are modified by using selective recomputation pursuant to any SQL update operation or bulk load insert operation, where a materialized view contains a unique key.

The preferred embodiment of the present invention will now be described, by way of example, with reference to the accompanying drawings.

DETAILED DESCRIPTION OF THE INVENTION

A detailed description of the present invention can be found in Palpanas et al., "Incremental Maintenance for Non-Distributive Aggregate Functions", Proc. of the 28th VLDB Conf., Hong Kong, 2002, which is hereby incorporated by reference.

Figure 1:
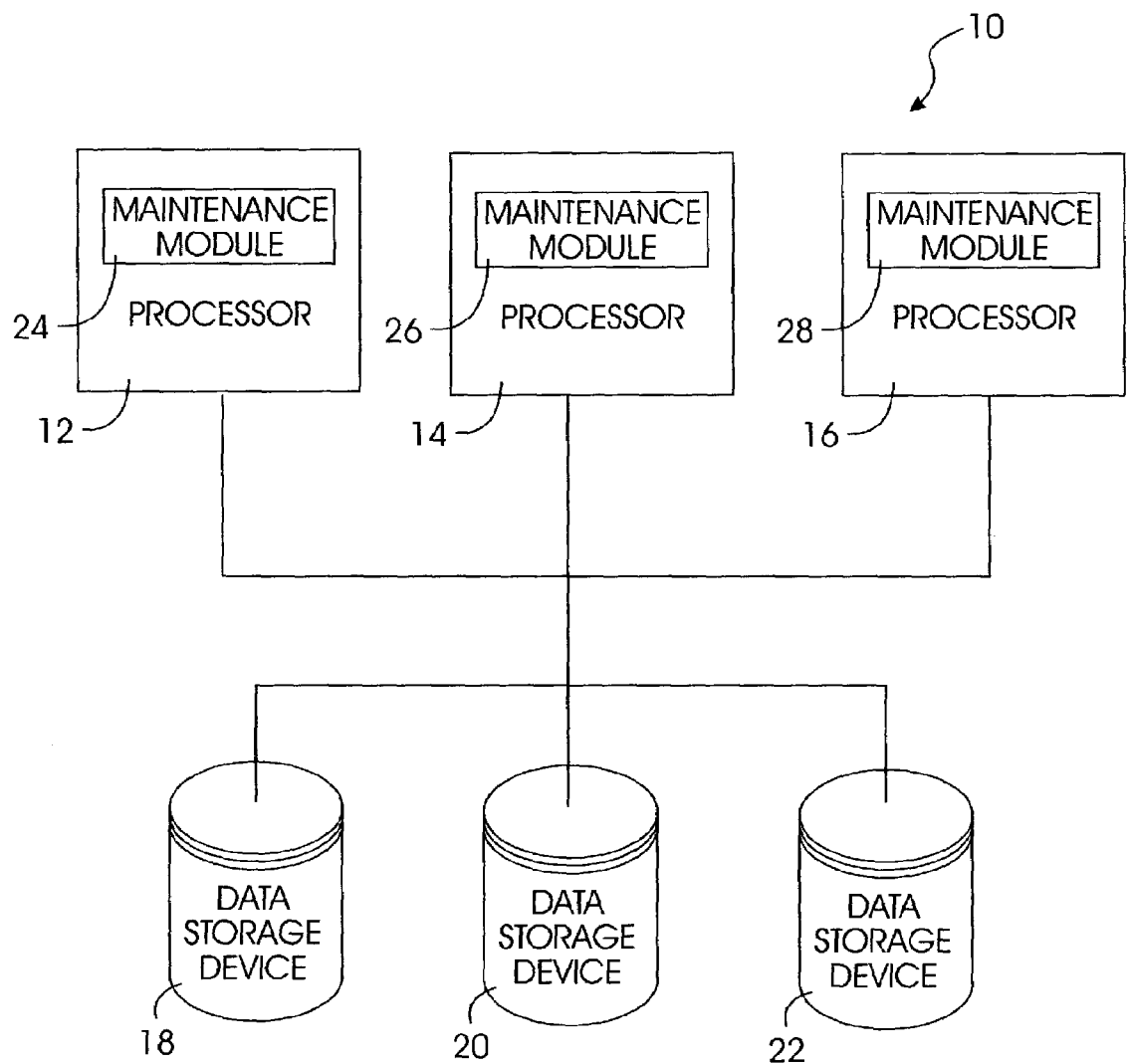
FIG. 1 is a block diagram of a system architecture.

Referring initially to FIG. 1, the system architecture is shown and is generally designated 10. FIG. 1 shows that the system 10 includes one or more processors 12, 14, 16 that are connected to one or more data storage devices 18, 20, 22, such as disk drives, in which one or more relational databases are stored. In a preferred embodiment, each processor 12, 14, 16 includes a maintenance module 24, 26, 28 for incrementally maintaining materialized views of the relational databases stored in the storage devices 18, 20, 22.

Preferably, each of the processors 12, 14, 16 utilize a standard operator interface, e.g., IMS/DB/DC, CICS, TSO, OS/2 or other similar interface, to transmit electrical signals to and from the processors 12, 14, 16. The electrical signals represent commands for performing various search and retrieval functions, i.e., termed queries, against the databases stored in the data storage devices 18, 20, 22. Preferably, these queries conform to the Structured Query Language (SQL) standard, and invoke functions performed by Relational Database Management System (RDBMS) software. In a preferred embodiment, the RDBMS software comprises the DB2 product offered by IBM for the MVS, OS/2, UNIX, or WINDOWS NT operating systems. Those skilled in the art will recognize, however, that the present invention has application to any RDBMS software.

It is to be understood that, in a preferred embodiment, each processor 12, 14, 16 includes a series of computer-executable instructions, as described below, which will allow each processor to provide incremental maintenance for materialized views in the relational databases residing on the data storage devices 18, 20, 22. These instructions may reside, for example, in the maintenance modules 24, 26, 28 of the processors 12, 14, 16, which can simply be a portion of the random access memory (RAM) of the processors 12, 14, 16.

Alternatively, the instructions may be contained on a data storage device with a computer readable medium, such as a computer diskette. Or, the instructions may be stored on a magnetic tape, hard disk drive, electronic read-only memory (ROM), optical storage device, or other appropriate data storage device or transmitting device thereby making a computer program product, i.e., an article of manufacture according to the invention. In an illustrative embodiment of the invention, the computer-executable instructions may be lines of C++ compatible code.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program elements in a form that instructs a digital processing apparatus (that is, a computer) to perform a sequence of function steps corresponding to those shown.

Figure 2:
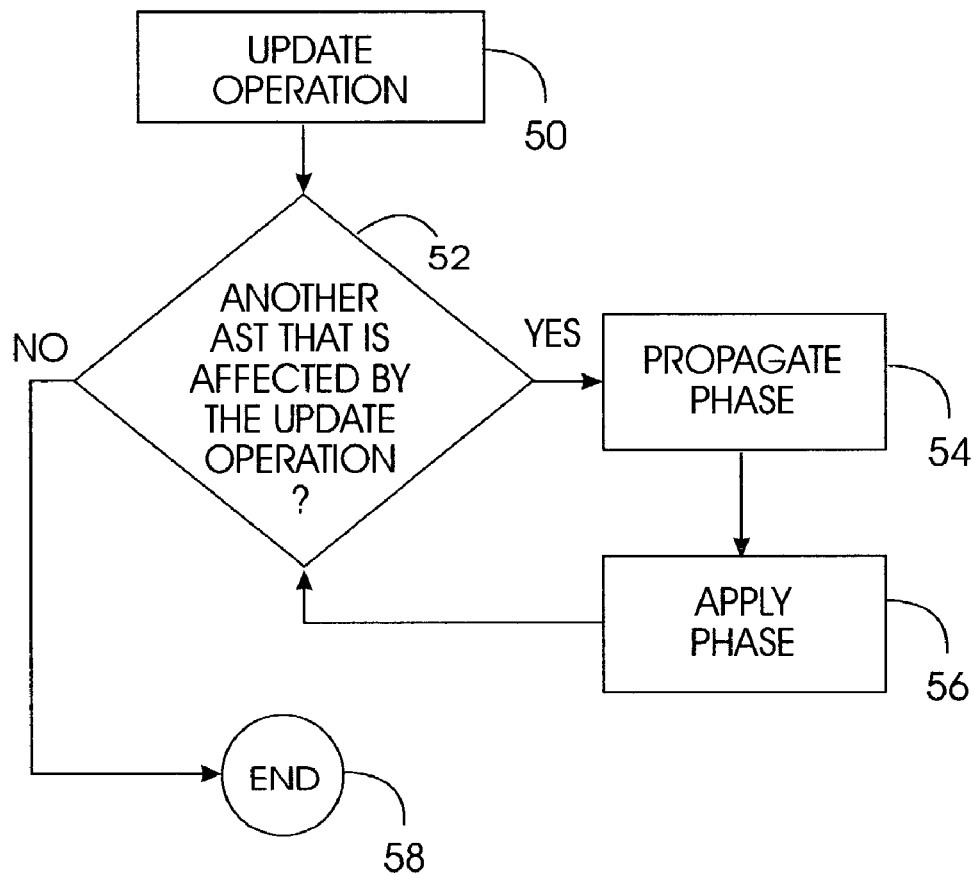
FIG. 2 is a flow chart of the general compile-time logic of the present invention.

Referring to FIG. 2, the general compile-time logic of the present invention is shown and commences at block 50 with an update operation to the base data in one or more ASTs. At decision diamond 52 it is determined whether another AST is affected by the update, and if so, the logic proceeds to block 54 to execute the below-described propagate phase and then to block 56 to execute the apply phase discussed further herein. The logic then loops back to decision diamond 52. When no other ASTs are affected the logic ends at state 58.

It is to be understood that the propagate and apply operations at blocks 54 and 56 establish a compilation step. The execution of the results of these two phases of compilation includes computing a set of changes that must be made to the ASTs, and applying the changes.

In the preferred non-limiting embodiment, the main compilation work is during the construction of a query graph model (QGM). Haas et al., "Extensible Query Processing in Starburst", ACM SIGMOD Int'l Conf., Portland, Oreg. 1989, pp. 377–388, incorporated herein by reference, sets forth details of QGM. For convenience, a QGM is a structural representation of one or more SQL statements. The QGM consists of boxes and edges between the boxes. Each box implements one or more relational operations on its input columns, and also specifies the output columns. The edges denote the flow of tuples from the output columns of one box to the input columns of another box.

It is to be further understood that during compilation of an update/delete/insert (UDI) statement, for each AST that depends on base tables that are affected by the UDI statement, the propagate phase of AST maintenance compilation is performed, as is the apply phase of AST maintenance compilation. This produces a program which, when executed, results in updating the base tables. Also, for each AST that depends on the updated base tables, the set of changes that must be made to the AST is computed (this is the propagate phase of execution), and then the changes applied to the AST (this is the apply phase of execution).

Figure 3:
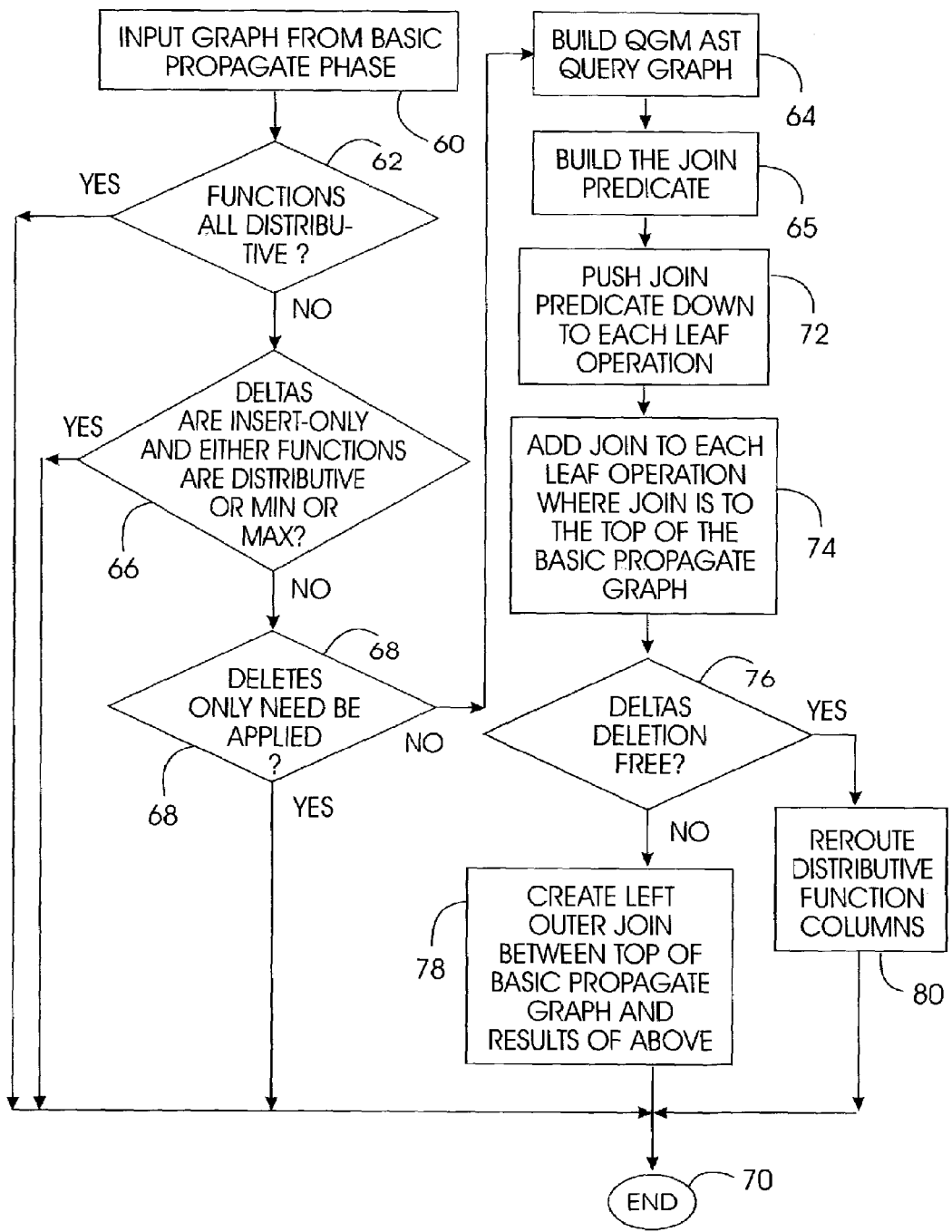
FIG. 3 is a flow chart of the propagate phase logic.

Referring to FIG. 3, the detailed propagate phase logic is shown. It is to be understood that the propagate phase logic represents compile time that occurs prior to each update being made permanent. Commencing at block 60, a basic propagate phase graph resulting from a propagate phase for distributive aggregate functions is input to a maintenance module 24, 26, 28. It is to be appreciated that this basic propagate phase graph is predetermined using techniques well known in the art. Moving to decision diamond 62, it is determined whether the functions of the updates are all distributive. If so, the logic ends at state 70. If not, the logic moves to decision diamond 66, wherein it is determined whether the deltas, e.g., the changes to the ASTs, are insert-only and either functions are distributive or MIN or MAX. A positive test result ends the logic at state 70, but a negative test result sends the logic to yet another decision at diamond 68, wherein it is determined whether only deletes need be applied to the ASTs. If so, the logic ends at state 70.

A negative test at decision diamond 68, however, sends the logic to block 64, wherein a QGM AST query graph is built. At block 65, a join predicate is built between the basic propagate phase graph and the AST query graph. The join predicate is between the unique key of the basic propagate graph and the unique key of the AST query graph. For a simple group-by query, these unique keys consist of the columns of the GROUP BY clause. For complex group-by queries (super-aggregates), the unique key is described below.

Proceeding to block 72, the join predicate is pushed down to each leaf operation. More specifically, the join predicate is pushed down to each leaf operation of the AST query graph where a "leaf operation" is one of the lowest QGM operations of the graph that operate directly on one or more of the base tables.

At block 74, the join is added to each leaf operation wherein the join is to the top of the basic propagation graph input above to yield a new propagate phase graph. Continuing to decision diamond 76, it is determined whether the deltas are deletion free. If not, the logic moves to block 78 and a left outer join is created between the top of the basic propagate graph and the results of the above, i.e., the new propagate phase graph. The left outer join is added to preserve deleted rows from the basic propagate phase. The recomputation step uses the after-image of the updated base tables. If all rows that contribute to a given group (row) of the AST are deleted from the base tables, then this group will not appear in the result of the recomputation. The outer join preserves such rows so that they will be deleted from the AST correctly.

Also, when the outer join of step 78 is required, certain aggregate functions will be computed by each operand of the join, as described in Section 3.2 of Palpanas et al. Briefly and for convenience, to eliminate the inefficiency of computing new values for distributive aggregative functions twice (once during the computation of the propagate delta and again during the selective recomputation of the AST), the distributive aggregate functions are computed by the left side of the join which is the basic propagate phase. On the other hand, the non-distributive functions are computed by the right side of the join, which is the selective recomputation step.

At decision diamond 76, if the deltas are deletion free, the logic moves to block 80 where the distributive function columns are rerouted to eliminate unnecessary join operations. More specifically, at block 80, the columns for the distributive aggregate functions are rerouted ("pulled up") from the top of the basic propagate phase graph, through the joins that were created after the join pushdown at step 74 up to the top of the AST query graph (which is the top of the new propagate phase graph).

The functionality described above is a prime component of the incremental maintenance procedure of the present invention and defines the class of ASTs that the method of the present invention supports. First, there is a requirement that there exists a key that uniquely identifies the tuples in the AST. Second, given a predicate on the aforementioned unique key, it is required that it is possible to push the predicate down through the AST query graph model (QGM) graph to the leaf operations. If these two requirements are met, then the AST is accepted as incrementally maintainable, since the selective recomputation step can be efficiently supported. It happens, however, that the basic predicate pushdown logic, described above, does not support predicate pushdown through super-aggregates. A super-aggregate is a SQL language clause that supports the computation of measures for different levels of a hierarchy. The result of a super-aggregate is a table that contains the union of many simple group-by operations not all of which contain the same set of grouping columns. In the resulting table, one can identify which rows belong to each simple group-by. A column in the group-by clause of a super-aggregate is referred to as a dimension column. If the dimension column is not nullable, then a NULL value for this column indicates that it is not one of the grouping columns for a given row. For nullable columns, SQL provides a "GROUPING" function whose value is zero (0) when the dimension is one of the grouping columns and one (1) when it is not.

To satisfy the unique key requirement for incremental maintenance, a dimension column in a super-aggregate AST must either be non-nullable or contain a corresponding indicator column that computes the GROUPING function for the dimension. Pushing predicates through a grouping expression that contains a super-aggregate must alter the predicate in such a way as to appropriately recompute the aggregate values for each of the affected groups. If the super-aggregate computes values for different levels in a dimension hierarchy, the results of the propagate will contain rows for each level in the hierarchy that must be modified. The predicate pushdown must ensure that subtotals for higher levels in the hierarchy do not double count the contributions from the lower levels. Accordingly, when the AST involves a super-aggregate predicate, special predicate pushdown rules must be utilized to avoid erroneous results.

Figure 4:
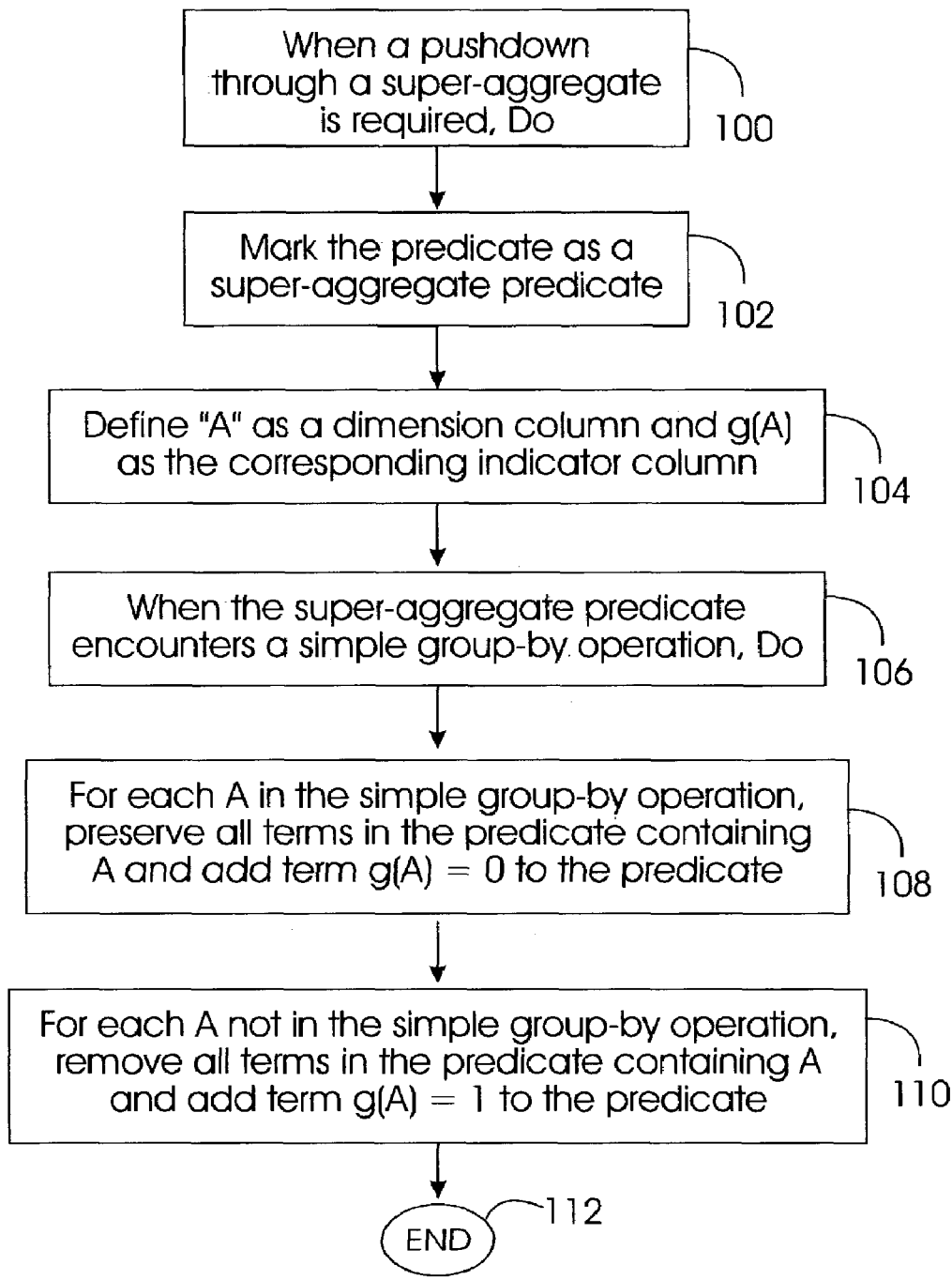
FIG. 4 is a flow chart of a subroutine of the propagate phase logic.

For super-aggregates, FIG. 4 is the content of block 72 above. The super-aggregate predicate pushdown logic is shown and commences at block 100 with a do loop wherein when a pushdown through a super-aggregate predicate is required the following steps are performed. At block 102, the predicate is marked as a super-aggregate predicate. Next, at block 104, "A" is defined as a dimension column and "g(A)" is defined as the corresponding indicator column. Proceeding to block 106, when the marked super-aggregate predicate encounters a simple group-by operation, an inner do loop is entered wherein the succeeding steps are performed. At block 108, for each A in the simple group-by operation, preserve all terms in the predicate containing A and add term g(A)=0 to the predicate. Then, at block 110, for each A not in the simple group-by operation, remove all terms in the predicate containing A and add term g(A)=1 to the predicate. The logic then ends at state 112.

Figure 5A:
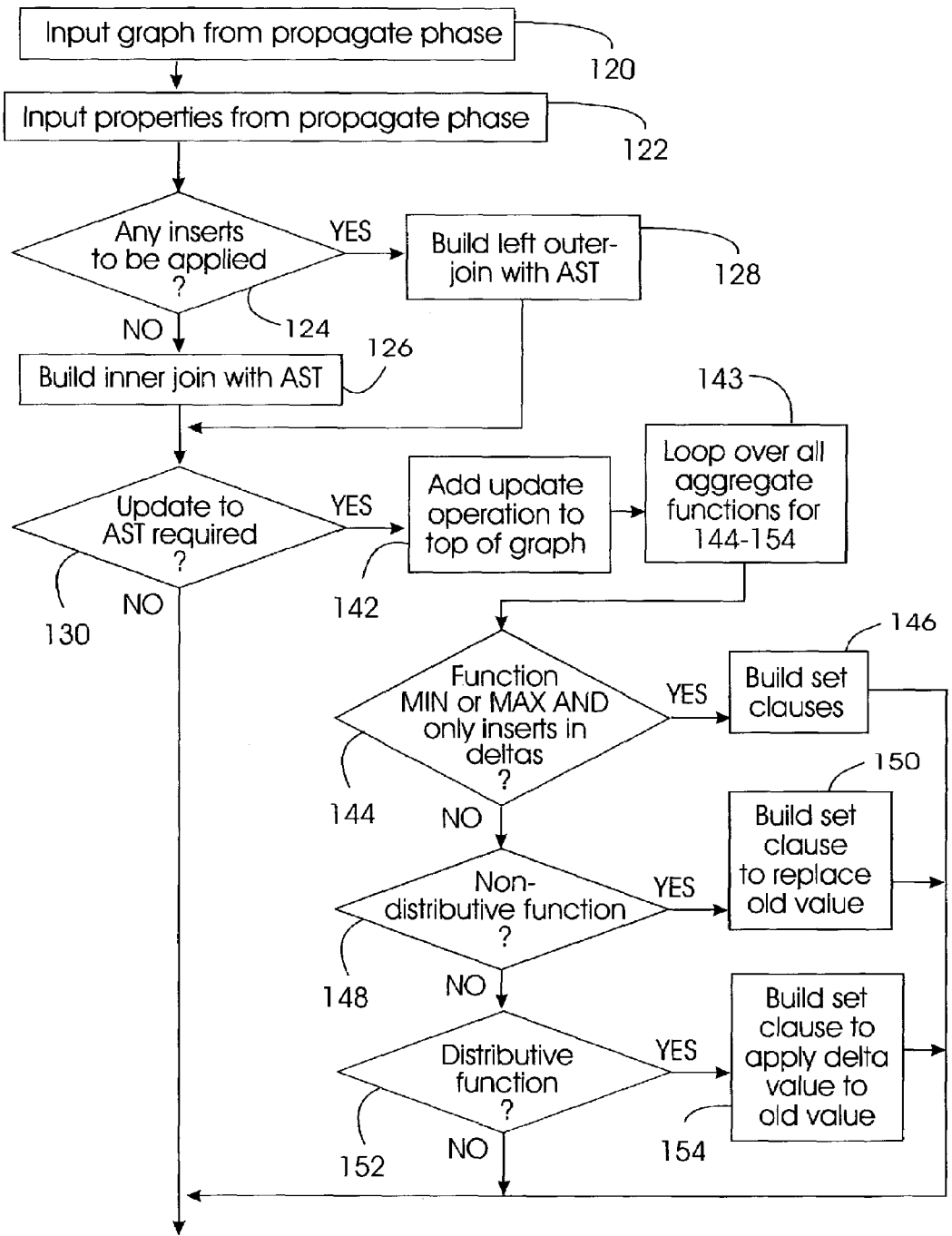
FIG. 5 is a flow chart of the apply phase logic.
Figure 5B:
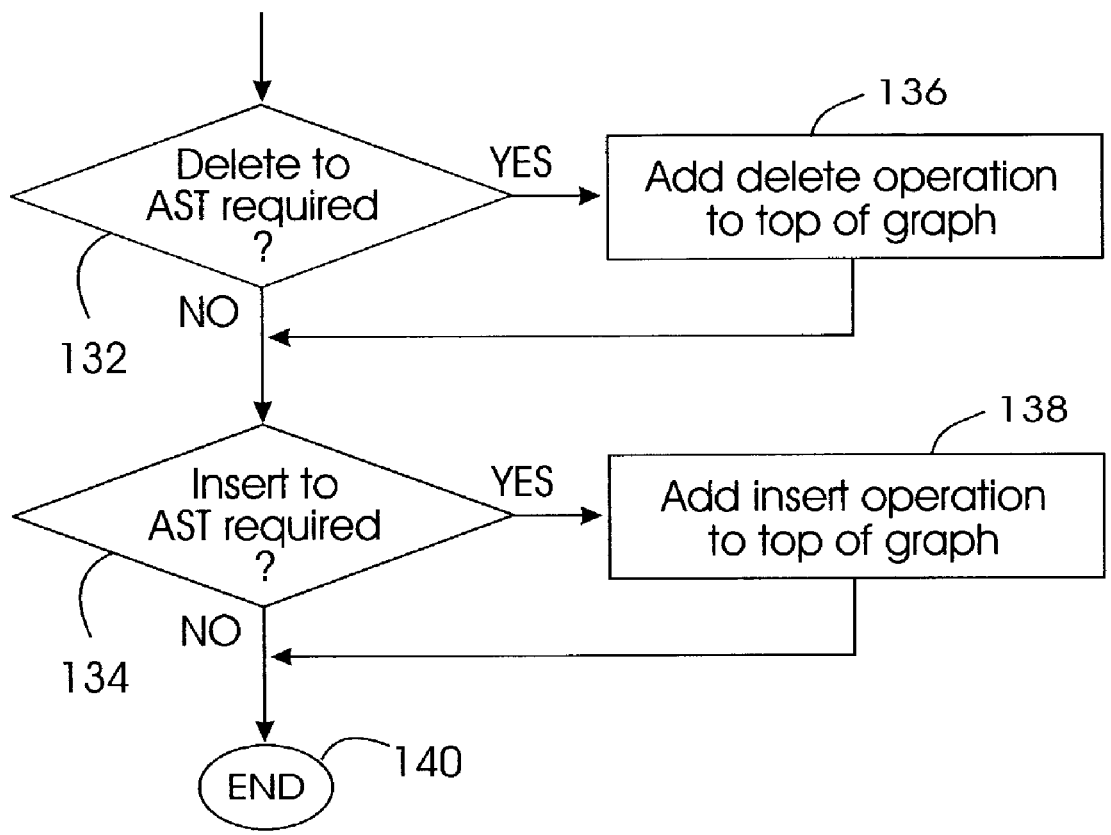

FIG. 5 shows the apply phase logic which commences with block 120 where the new graph obtained during the propagate phase is input. At block 122, the properties from the propagate phase are also input. Moving to decision diamond 124, it is determined whether any inserts are to be applied to the AST. If not, an inner join is built between the new propagate phase graph and the AST at block 126. If so, a left outer join is built between the new propagate phase graph and the AST at block 128. From block 126 or block 128, the logic continues to decision diamond 130 where it is determined whether an update to the AST is required.

If an update is not required, the logic proceeds to decision diamond 132 where it is determined whether a delete to an AST is required. If not, the logic moves to decision diamond 134 where it is determined whether an insert to the AST is required. At decision diamond 132, if a delete is required, the logic moves to block 136 and a delete operation on the AST is added at the top of the graph with the corresponding predicate. The predicate is created such that the delete operation only processes the input rows that are to be deleted. At execution time, the results of the preceding steps can contain a mixture of rows: rows to be deleted, rows to be inserted, and rows to be updated. So each update/delete/insert operation of the apply phase must selectively process its input rows. This is the purpose of the predicates. The logic then proceeds to decision diamond 134.

At decision diamond 134 it is determined whether an insert to an AST is required. If so, the logic moves to block 138 and an insert operation on the AST is added at the top of the graph with the corresponding predicate. Here "corresponding predicate" is required such that insert only processes those rows that are to be inserted. Otherwise, the logic ends at state 140.

Returning to decision diamond 130, if an update to an AST is required, the logic moves to block 142 where an update operation on the AST is added at the top of the graph with the corresponding predicate. Here "corresponding predicate" is required to only process the update rows. Block 143 indicates that the operations described below at 144–154 are evaluated for each aggregate function (i.e. a loop).

At decision diamond 144, it is determined whether the function is MIN or MAX and only the deltas are only inserts. If so, the logic moves to block 146, where set clauses are built as follows:

```
newMin = case when (oldMin is null) then newValue
    when (newValue < oldMin) then newValue
    else oldMin
end
newMax = case when (oldMax is null) then newValue
    when (newValue > oldMax) then newValue
    else oldMax
end
```

The logic then proceeds to decision diamond 132 and continues as described above.

Returning to decision diamond 144 if the decision is negative, the logic moves to decision diamond 148 where it is determined whether the function is a non-distributive function. If so, the logic moves to block 150 and a set clause is built to replace the old value. The logic then continues to decision diamond 132 and continues as described above. If the function is not a non-distributive function in decision diamond 148, the logic moves to decision diamond 152 where it is determined whether the function is a distributive function. If so, a set clause is built to apply the delta value to the old value. From block 154, or a negative response at decision diamond 152, the logic continues to decision diamond 132 and continues as described above.

While the particular SYSTEM AND METHOD FOR INCREMENTALLY MAINTAINING NON-DISTRIBUTIVE AGGREGATE FUNCTIONS IN A RELATIONAL DATABASE as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A system for incrementally maintaining non-distributive aggregate functions in materialized views of relational databases, comprising:
   at least one data storage device including at least one relational database;
   at least one processor communicating with said data storage device;
   at least one database maintenance module associated with said processor and including a program for selectively altering a predetermined propagate phase data structure to yield a new propagate phase data structure and for selectively applying changes to at least one materialized view according to said new propagate phase data structure, wherein:
   when a grouping expression contains a super-aggregate, the program undertakes logic including:
   marking a predicate as a super-aggregate predicate;
   defining a dimension column A and a corresponding indicator column g(A); and when the marked predicate encounters a simple group-by operation, iteratively;
   (a) for each A in said simple group-by operation, preserving all terms in said marked predicate containing A and adding term g(A)=0 to said marked predicate; and
   (b) for each A not in said simple group-by operation, removing all terms in said marked predicate containing A and adding term g(A)=1 to said marded predicate.

2. A computer system for incrementally maintaining non-distributive aggregate functions in materialized views of relational databases, comprising:
   means for selectively altering a predetermined propagate phase data structure to yield a new propagate phase data structure by
   (a) building an AST query graph;
   (b) building a join predicate between a predetermined propagate phase data structure and said AST query graph;
   (c) pushing said join predicate down to each leaf operation of said AST query graph;
   (d) adding said join predicate to each leaf operation where said join predicate is to the top of said a predetermined propagate phase data structure; and
   means for selectively applying changes to at least one materialized view according to said new propagate phase data structure.

3. The computer program product of claim 2, wherein said altering includes:
   building an AST query graph;

building a join predicate between said predetermined propagate phase data structure and said AST query graph;

pushing down said join predicate to each leaf operation of said AST query graph;

adding said join predicate to each said leaf operation wherein said join predicate is to the top of said predetermined propagate phase data structure, yielding said new propagate phase data structure;

if said deltas are deletion free, then rerouting distributive function columns to eliminate unnecessary join operations, else creating a left outer join between the top of said predetermined propagate phase data structure and said AST query graph.

4. The computer program product of claim 3, wherein when a grouping expression contains a super-aggregate, said predicate pushing down comprises:

marking said predicate as a super-aggregate predicate;

defining a dimension column A and a corresponding indicator column g(A); and when said marked predicate encounters a simple group-by operation, iteratively:

(a) for each A in said simple group-by operation, preserving all terms in said marked predicate containing A and adding term g(A)=0 to said marked predicate; and (b) for each A not in said simple group-by operation, removing all terms in said marked predicate containing A and adding term g(A)=1 to said marked predicate.

5. The computer program product of claim 3, wherein said applying includes:

if any inserts to said materialized view are required, then building a left outer join between said new propagate phase data structure and said materialized view, else building an inner join between said materialized view and said new propagate phase data structure;

if any updates to said materialized view are required, then adding an update operation on said materialized view at the top of said new propagate phase data structure with the corresponding predicate and iteratively building set clauses for all aggregate functions;

if any deletes to said materialized view are required, then adding a delete operation on said materialized view at the top of said new propagate phase data structure with the corresponding predicate;

if any inserts to said materialized view are required, then adding an insert operation on said materialized view at the top of said new propagate phase data structure with the corresponding predicate.

6. The computer program product of claim 5, wherein said iterative building includes:

if said aggregate function is a MIN function or a MAX function, and if said deltas are only inserts, then building said set clauses by conditionally updating new minimum and new maximum values as:

(a) newMin=newValue if [(oldMin is NULL) or (newValue<oldMin)]

(b) newMax=newValue if [(oldMax is NULL) or (newValue>oldMax)]; else if said aggregate function is non-distributive then building a set clause to replace the old value, otherwise building a set clause to apply the delta value to the old value.

7. A computer program product comprising a machine-readable medium having machine-executable instructions thereon including code for incrementally maintaining non-distributive aggregate functions in materialized views of relational databases, said code comprising:

a first code for selectively altering a predetermined propagate phase data structure to yield a new propagate phase data structure; and a second code for selectively applying changes to at least one materialized view according to said new propagate phase data structure, wherein said altering occurs only if all of the following conditions are false;

(a) all functions of a query are distributive;

(b) deltas in said query are insert-only, and said functions are either distributive or MAX functions or MIN functions; and (c) only deletes need be applied to said materialized views.

8. A method for incrementally maintaining non-distributive aggregate functions in materialized views of relational databases, comprising:

selectively altering a predetermined propagate phase data structure to yield a new propagate phase data structure;

selectively applying changes to at least one materialized view according to said new propagate phase data structure, wherein said applying includes:

if any inserts to said materialized view are required, then building a left outer join between said new propagate phase data structure and said materialized view, else building an inner join between said materialized view and said new propagate phase data structure;

if any updates to said materialized view are required, then adding an update operation on said materialized view at the top of said new propagate phase data structure with the corresponding predicate and iteratively building set clauses for all aggregate functions;

if any deletes to said materialized view are required, then adding a delete operation on said materialized view at the top of said new propagate phase data structure with the corresponding predicate;

if any inserts to said materialized view are required, then adding an insert operation on said materialized view at the top of said new propagate phase data structure with the corresponding predicate.

9. The method of claim 8, wherein said altering occurs only if all of the following conditions are false:

(a) all functions of a query are distributive;

(b) deltas in said query are insert-only and said functions are either distributive or MAX functions or MIN functions; and (c) only deletes need be applied to said materialized views.

10. The method of claim 9, wherein said altering includes:

building an AST query graph;

building a join predicate on said predetermined propagate phase data structure and said AST query graph;

pushing down said join predicate to each leaf operation of said AST query graph;

adding said join predicate to each said leaf operation wherein said join predicate is to the top of said predetermined propagate phase data structure, yielding said new propagate phase data structure;

if said deltas are deletion free, then rerouting distributive function columns to eliminate unnecessary join operations, else creating a left outer join between the top of said predetermined propagate phase data structure and said AST query graph.

11. The method of claim 10, wherein when a grouping expression contains a super-aggregate, said predicate pushing down comprises:

marking said predicate as a super-aggregate predicate;

defining a dimension column A and a corresponding indicator column g(A); and when said marked predicate encounters a simple group-by operation, iteratively:
- (a) for each A in said simple group-by operation, preserving all terms in said marked predicate containing A and adding term g(A)=0 to said marked predicate; and
- (b) for each A not in said simple group-by operation, removing all terms in said marked predicate containing A and adding term g(A)=1 to said marked predicate.

12. The method of claim 8, wherein said iterative building includes:

if said aggregate function is a MIN function or a MAX function, and if said deltas are only inserts, then building said set clauses by conditionally updating new minimum and new maximum values as:
- (a) newMin=newValue if [(oldMin is NULL) or (newValue<oldMin)]
- (b) newMax=newValue if [(oldMax is NULL) or (newValue>oldMax)]; else if said aggregate function is non-distributive then building a set clause to replace the old value, otherwise building a set clause to apply the delta value to the old value.

* * * * *